United States Patent [19]
Reiche

[11] 3,777,728
[45] Dec. 11, 1973

[54] PROCESS AND APPARATUS FOR ASSISTING IN STARTING INTERNAL COMBUSTION ENGINES

[75] Inventor: Alfons Reiche, Cologne, Germany

[73] Assignee: Peter Gessner, Bensberg, Germany

[22] Filed: Apr. 28, 1972

[21] Appl. No.: 248,757

[30] Foreign Application Priority Data
May 21, 1971 Germany .................. P 21 25 204.0

[52] U.S. Cl. ......................... 123/122 D, 123/179 H
[51] Int. Cl. .......................................... F02m 31/04
[58] Field of Search ................... 123/122 R, 122 D, 123/122 F, 142.5 R, 179 R, 180 R

[56] References Cited
FOREIGN PATENTS OR APPLICATIONS

| | | | |
|---|---|---|---|
| 90,786 | 4/1961 | Denmark | 123/122 F |
| 826,089 | 12/1951 | Germany | 123/122 D |
| 432,150 | 7/1935 | Great Britain | 123/122 D |

*Primary Examiner*—Al Lawrence Smith
*Attorney*—Herbert W. Kenway et al.

[57] ABSTRACT

A process and equipment for facilitating the starting of internal combustion engines by heating the intake air of a fuel-air mixture before the air reaches the carburetor of the engine. The preferred preheating device is a halogen bulb enclosed by a metal grid over and through which the intake air flows.

6 Claims, 2 Drawing Figures

PATENTED DEC 11 1973

3,777,728

PROCESS AND APPARATUS FOR ASSISTING IN STARTING INTERNAL COMBUSTION ENGINES

BACKGROUND OF THE INVENTION

Starting an internal combustion engine at low ambient temperatures is notoriously difficult for a number of reasons and the lower the temperature, the greater the problem. One aspect of the problem, which has been somewhat neglected, stems from the fact that the fuel in the fuel-air mixture is subject to condensation because both the intake air and the fuel are at the low ambient temperature. Also, of course, the walls of the inlet system are at that low temperature and the fuel condensate tends to precipitate upon those walls. As a result, the fuel-air mixture reaching the combustion chamber is very lean and is therefore difficult or impossible to ignite.

As partial compensation for this problem, it is the general practice to provide a choke for the engine which operates to increase or enrich the fuel content of the mixture. The theory is simply that if the fuel-air mixture is made sufficiently rich in fuel as it enters the system, it will still be rich enough to ignite in the combustion chamber despite the partial fuel precipitation on the cold walls of the inlet system.

One of the obvious disadvantages of choking is the increased fuel consumption which results. Also, especially when repeated attempts are made to start the engine, flooding occurs as the fuel precipitates at the spark plugs themselves and the wet spark plugs are unable to fire.

The major objective of the present invention is to eliminate the disadvantages noted and to permit easy starting of internal combustion engines despite the cold ambient temperatures.

GENERAL DESCRIPTION

Basically, the invention involves preheating of intake air before it is mixed with fuel at the carburetor of the engine. Such a basic concept is not entirely new inasmuch as various preheating devices have previously been suggested for the intake systems of internal combustion engines. Nevertheless, the devices that have been proposed have not been successful because of improper location, slow heating, high costs, difficult maintenance, short life or combinations of these difficulties. In the present invention, an appropriate preheating device is positioned preferably in the air filter of the intake system before the carburetor of the engine. A preferred heating device is a halogen bulb which may be enclosed by a grid of metal such as stainless steel, brass or copper gauze. Such a heating device provides almost instantaneous high heat output; the life of the bulb is long; its location in the air filter permits it to be effective in heating intake air both by radiation and convection; replacement, when necessary, is simplified and bulbs are relatively inexpensive.

DETAILED DESCRIPTION

Figure 1:
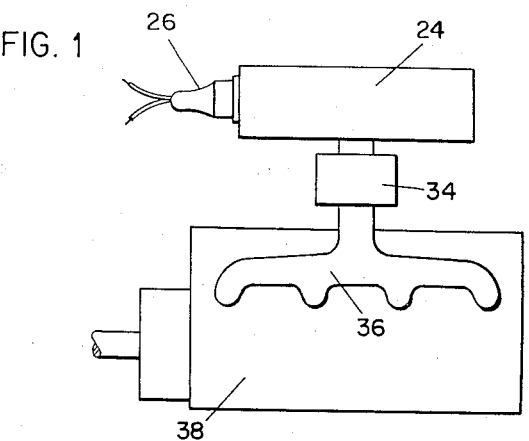
Figure 2:
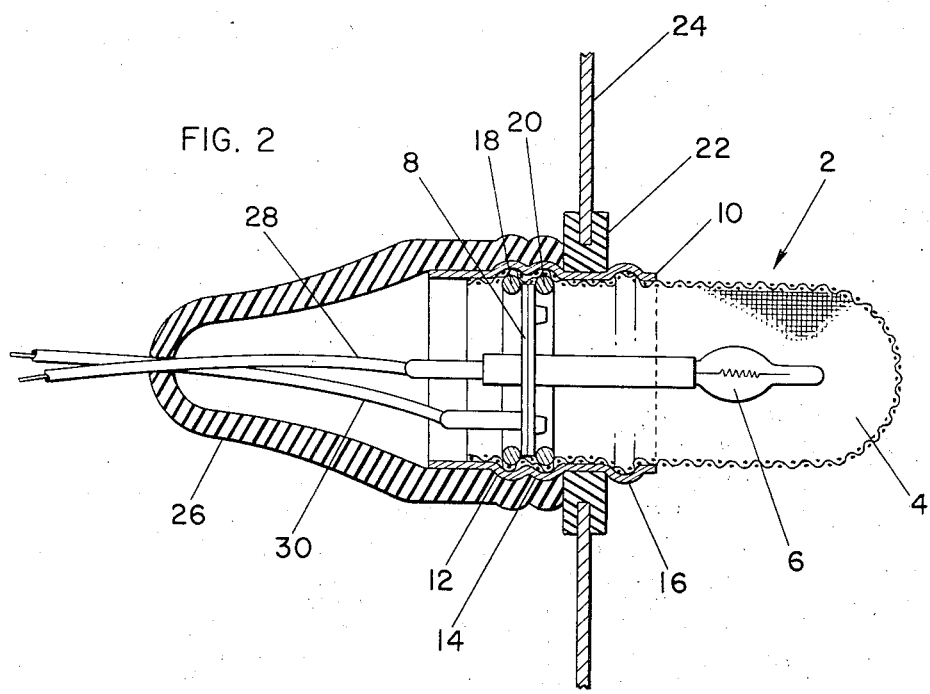

FIG. 1 illustrates, partly in section, a preferred embodiment of the invention; and FIG. 2 illustrates, in outline, an application of the invention to an internal combustion engine in FIG. 1.

There may be seen a heating device 2 which consists of a halogen bulb 6 enclosed by a metal grid 4. The metal grid 4 is fastened in a socket 10 from which it derives its support. Adjacent the base of the socket 10 is a round plate 8 which serves as one of the electrical contacts for the halogen bulb 6.

The metal grid 4 can be made of any one of several materials such as stainless steel, brass or copper gauze and is generally cylindrical in shape having a closed outer end. The inner end may be supported in the socket 10 by any convenient means but is preferably rolled into circumferential ribs 12, 14 and 16 formed in the socket wall. By forcing the metal grid into the circumferential ribs, a tight connection and good structural support are achieved. If desired, even better support and contact can be achieved by wrapping the exterior cylindrical surface of the metal grid 4 with copper foil. Two snap rings 18 and 20 may be used to force the metal grid into intimate contact with the circumferential ribs 12 and 14 respectively of the socket 10. The snap rings also serve the purpose of maintaining the round plate 8 in position adjacent the base of the metal grid. The halogen bulb 6 may also derive its support from the metal plate 8.

Surrounding the socket 10 in the area between the circumferential ribs 14 and 16 is a rubber ferrule 22 which is sealed tightly to the exterior wall of the socket 10. The rubber ferrule 22 has a circumferential slot by which it may be mounted in the wall 24 of an air filter for the engine. Of course, the heater may be installed in another area of the air intake of the system in similar fashion in which case the element 24 would represent the particular wall in which the heating element is installed.

A rubber cap 26 may be utilized to cover the end of the socket 10 to protect it from oil, road dirt, salt and weather in general. Cables 28 and 30 pass through the rubber cap 26 to supply current to the halogen bulb 6. The cable 26 connects directly to the round plate 8 as one contact for the system and the cable 28 passes centrally through the round plate 8 to provide the other contact for the halogen bulb.

FIG. 2 illustrates in outline an internal combustion engine. The previously mentioned air filter 24 and rubber cap 26 may be seen at the top of the drawing. As is conventional, the air filter 24 is supported upon and communicates with a carburetor 34, which, in turn, communicates with an intake manifold 36 mounted upon the wall of an internal combustion engine 38.

Although the heating mechanism is shown as penetrating a side wall of the air filter, it may be placed at other areas of the air filter or in the air intake line to the carburetor 34, as was mentioned above. The position of the heating apparatus in the air filter is determined by the design of that element, the important point being that the heater be placed in such a position that the main air stream passing through the filter encounters the heating element.

In operation, the heating element 2 is turned on by means of a switch (not shown) prior to attempting to start the engine. Current is supplied from the car battery and the halogen bulb commences to supply heat almost instantaneously. The heat which is released from the wall of the halogen bulb is partially absorbed by the metal grid 4 and the metal grid 4 rapidly increases in temperature to approximately 80° to 100° C. Concurrently, air in the air filter or intake system is drawn over and through the metal grid and it in turn is heated by radiation and convection in an extremely short period of time. Once the engine is running, the heating element can be switched off and conventional operation of the engine will continue.

The nature of the heating element is such that it can easily be added to existing engines or it can be installed as original equipment. The only mechanical modification necessary in either case is the provision of an opening in which the rubber ferrule 22 can be inserted. Even at sub-zero temperatures, the inlet air heating system of the present invention has enabled motor vehicle engines to be started quickly and easily.

What is claimed is:

1. Apparatus for facilitating the starting of an internal combustion engine to which a mixture of fuel and air are supplied by a carburetor, the air intake system for said carburetor including an air filter through which air passes before entering said carburetor, comprising a halogen bulb disposed in said air intake system in a position to heat said air prior to its entry into said carburetor.

2. Apparatus as in claim 1, which further includes a metal grid enclosing said halogen bulb.

3. Apparatus as in claim 2 wherein said metal grid is composed of a gauze of material chosen from the group consisting of steel, brass or copper.

4. Apparatus as in claim 2 including a socket, said halogen bulb being end-mounted in said socket and said metal grid being supported in said socket in enclosing relationship to said bulb.

5. Apparatus as in claim 4 including a rubber ferrule disposed in a wall of said air filter, said socket being mounted in said rubber ferrule.

6. Apparatus as in claim 5 including a protective cap and current supply cables passing through said cap, said protective cap enclosing a portion of said socket which extends exteriorly of said wall of said air filter.

* * * * *